Feb. 5, 1929.  1,701,033
B. F. ELBERT
CAMPER'S CHARCOAL STOVE
Filed Dec. 20, 1927   2 Sheets-Sheet 1

Inventor
Benjamin F. Elbert.
by Orwig & Hague Attorneys.

Feb. 5, 1929.  B. F. ELBERT  1,701,033
CAMPER'S CHARCOAL STOVE
Filed Dec. 20, 1927   2 Sheets-Sheet 2
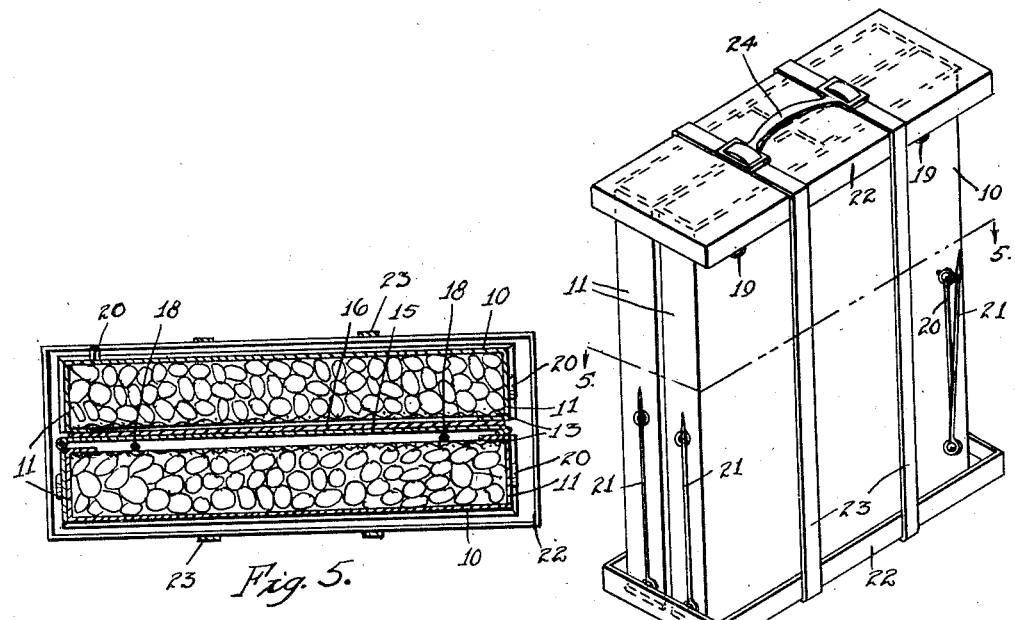
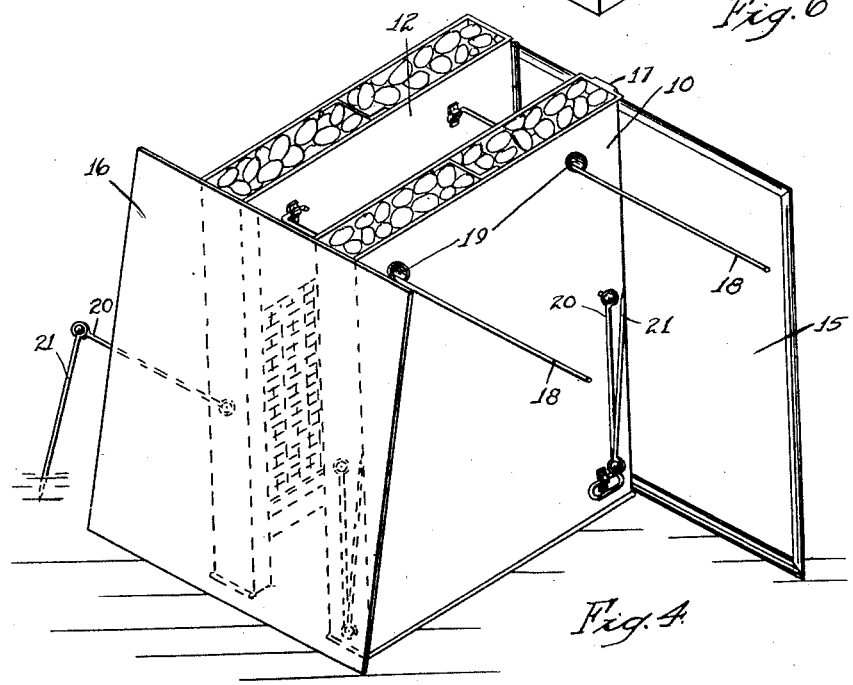
Inventor.
Benjamin F. Elbert.
By Orwig + Hague Attorneys.

Patented Feb. 5, 1929.

1,701,033

UNITED STATES PATENT OFFICE.

BENJAMIN F. ELBERT, OF DES MOINES, IOWA, ASSIGNOR TO BONNIE L. ELBERT, OF DES MOINES, IOWA.

CAMPER'S CHARCOAL STOVE.

Application filed December 20, 1927. Serial No. 241,407.

Heretofore when using charcoal as fuel for cooking purposes it has been customary to have the burning charcoal arranged on a horizontal grate with the meat to be cooked above it, but when this is done, the fatty substances and juices from the meat drip into the fire, and are thereby lost, and this is objectionable also because when they do burn, they cause a certain amount of smoke that is conveyed to and deposited upon the meat being cooked.

Another method of using charcoal as a fuel for cooking is to have the charcoal contained in a chamber with a vertical grate at one side and the meat is then supported on a turnspit which is continuously rotated either manually or by power. The great difficulty, however, with cookers of this character having vertical grates is on account of the difficulty of igniting the entire quantity of fuel adjacent to the grate and keeping it all in good burning condition, and also because of the fact that the meat is cooked only on one side at a time and the cooking process is relatively slow.

The objects of my invention are to provide a camper's charcoal stove of simple, durable and inexpensive construction which is free from all of the objections above noted to the similar devices now in common use, and to provide a stove of this character of simple and inexpensive construction, and in which the charcoal can be readily, quickly and easily ignited on two adjacent vertical grates spaced apart from each other and uniformly ignited throughout the entire area of each grate; and also to provide a stove of this character in which the meat to be cooked need not be turned, and will be cooked on both sides at the same time and be quickly seared when first inserted in position for cooking, and rapidly cooked so that a maximum quantity of the juices and fats will be retained in the meat and the entire cooking process can be completed in much less time than with the charcoal stoves now in common use.

A further object is to provide improved means for adjustably supporting the fuel magazines and grates in upright position upon the ground, and improved means for controlling the drafts from either the back, top or front of the stove.

A further object is to provide a stove of this character which may be readily, quickly and easily folded into a small and compact space and easily and conveniently transported, and at the same time to provide a fuel magazine in which the charcoal may be readily and easily transported.

My invention consists in the construction, arrangement and combination of the various parts of the device, whereby the objects contemplated are attained, as hereinafter more fully set forth, pointed out in my claims, and illustrated in the accompanying drawings, in which:

Figure 4 shows a perspective view illustrating the stove in the position for igniting the fuel.

Figure 5 shows a horizontal sectional view on the line 5—5 of Figure 6; and

Figure 6 shows a view of my improved stove in folded position ready for transportation.

Figures 2, 3:
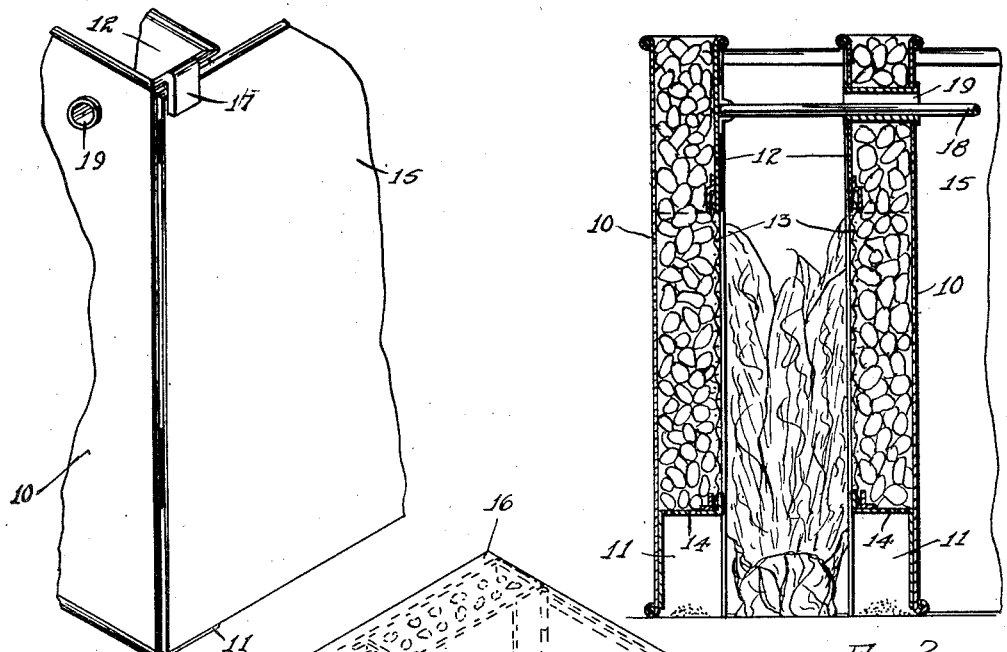
Figure 2 shows a vertical, transverse, sectional view through my improved stove with the magazines full of fuel and the temporary or igniting fire on the ground between them to illustrate the manner in which the fuel presented through the grate surfaces is ignited.
Figure 3 shows a detail perspective view illustrating the means for slidingly connecting one of the magazines with the hinged back member of the other magazine.

Referring to the accompanying drawings, it will be seen that there are two combined fuel magazines and grates, each of which is formed of an outer wall 10, upright end members 11 extended inwardly at right angles to the outer wall and of the same length vertically as the outer wall, and an inner wall, the upper portion of which is formed of sheet metal at 12 and a grate portion extending from the sheet metal top portion downwardly to a point spaced apart from the lower edge of the outer wall. This grate surface is indicated by the numeral 13. At the lower end of the grate surface there is a bottom for the fuel magazine, which extends outwardly from the bottom of the grate member to the outer wall, which bottom is indicated by the numeral 14.

Hinged to the rear upright member of one of the magazines is a stove back member 15 formed of sheet metal and of substantially the same height as the side member. This back is capable in one position of folding inwardly parallel with the inner wall and grate member of the magazine to which it is hinged, and in another position of standing at substantially right angles thereto, as shown in Figure 4.

The stove top member is a piece of flat sheet metal indicated by the numeral 16.

On the magazine opposite from the one to which the back is hinged, I have provided at the upper back edge thereof an arm 17 extended first rearwardly and then downwardly and designed to engage the back member and hold it against rearward movement, and at the same time hold the magazine to which the arm 17 is connected against inward and outward tilting movements.

Figure 1:
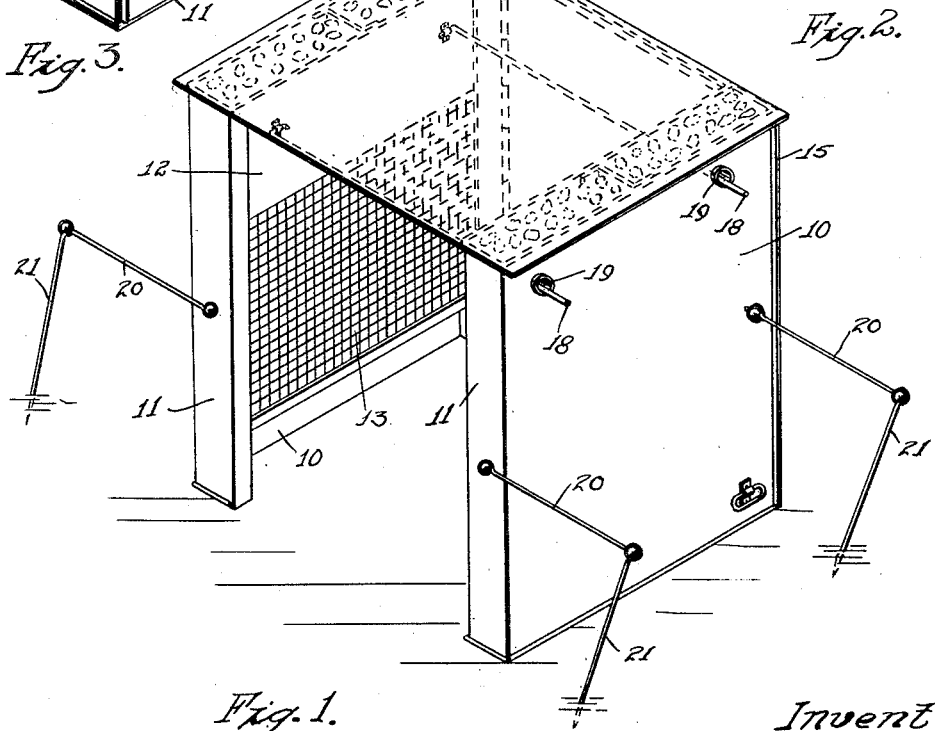
Figure 1 shows a perspective view illustrating my improved stove in position for use.

For the purpose of supporting articles to be cooked between the two grate surfaces, I preferably provide two rods 18 hinged at one end to one of the sheet metal inner wall members 12 above the grate 13 and capable of being projected through tubes 19 extended through the other magazine, as clearly shown in Figures 1 and 2. These rods are capable in one position of lying flat against the inner wall of the magazine to which they are hinged, and in another position of being extended through the tubes 19 to form supports for articles being cooked.

For the purpose of adjustably supporting the magazines in upright positions upon the ground, I have provided on each magazine two rods 20 pivoted to the magazine and having pointed rods 21 pivoted to their outer or free ends. When in use these rods 20 are extended outwardly away from the magazine and then the rods 21 are forced down into the ground, thus securely supporting the magazines in upright position. When not in use these rods 20 and 21 may be folded as shown in Figure 6.

For convenience in transportation I have provided two flat trays 22 of a size slightly larger than the upper and lower ends of the two magazines when placed adjacent to each other. In use one of the trays is first placed in an upright position on a support, and then the two magazines are placed in it and the other tray is then placed in an inverted position covering the upper ends of the magazines, and finally straps 23 are passed around the upper and lower trays and provided with a handle 24 by which the stove may be readily and easily grasped for carrying.

In practical use, I first preferably fill both magazines with charcoal or other similar fuel, and then pack them in the position shown in Figure 6. When in this condition the fuel or the dust from the fuel cannot escape from the trays, and the device may be readily and easily handled and shipped.

When it is desired to use the stove, the parts thereof are placed in the position shown in Figure 4, with the back closing the opening between the rear ends of the magazines and the top having its lower edge resting on the ground and tilted over with its top edge resting against the front of the magazines. In order to quickly and thoroughly ignite the fuel in both grate surfaces, it is only necessary for the operator to build a temporary fire, such for instance as a fire that can be made with newspapers which are placed in the position shown in Figure 2 and ignited. All of the air that reaches this temporary fire comes in at the bottom between the front edges of the magazines and the blaze is directly impinged upon the entire grate surface of each magazine. In a very short time the charcoal adjacent to these grate surfaces is ignited and in view of the fact that the grate surfaces are so close together, the heat generated from the fuel in one grate surface is projected toward the other grate surface, and thereby the entire mass of fuel adjacent to the grate surface is quickly and evenly ignited. As soon as the grate surfaces of both magazines are ignited, then the operator may by grasping the rods 20 move one of the magazines to the desired distance away from the other, such for instance as shown in Figure 1. Then the top 16 is placed upon the top of the magazines, thus stopping any draft through the magazines from the top of the grate surfaces upwardly, so that the fuel contained in the magazine above the grate surface will not burn. The meat or other material to be cooked is then supported upon the rods 18 and the operator may readily observe the condition of the material being cooked, because the entire front of the stove is open. The material is cooked very rapidly because the heat from both grate surfaces strikes it on opposite sides at the same time, so that it is quickly seared throughout its entire outer surface, and then quickly cooked. This searing and quick cooking prevents the escape to a great extent of the fats and juices contained in the material such as meat, and the meat is cooked quickly and thoroughly because of the combined action of the two adjacent grate surfaces contained within an oven like structure in which the heat generated by both grate surfaces is retained.

I have found in actual practice that meats cooked on my improved stove have a better flavor than meats cooked where the heat is presented to it on one side at a time only, or when cooked upon a turnspit before a single grate surface, because of the preliminary searing of the whole surface, and the combined action of the heat directly radiated from the two grate surfaces and combined with the oven like action of the stove.

After the stove has been used for cooking purposes, then a very desirable and advantageous result can be obtained by setting up the two magazines with their burning fuel edge to edge with the grates both facing the operator, thus forming a very efficient heating element for campers' use.

I claim as my invention:

1. In a stove, the combination of two combustion compartments, each having sheet metal outer and end portions and a perforated inner portion, each being designed to stand in upright positions, and a sheet metal rear wall for the stove, hingedly connected to one of the combustion compartments and capable in one position of lying flat against it and in another position of extending at substantially right angles to it and in engagement with the rear edge of the other compartment for holding the compartment to which it is hinged against side tilting movement.

2. In a stove, the combination of two combustion compartments, each having sheet metal outer and end portions and a perforated inner portion, and each being designed to stand in upright positions, a sheet metal rear wall for the stove hingedly connected to one of the combustion compartments and capable in one position of lying flat against it and in another position of extending at substantially right angles to it and in engagement with the rear edge of the other compartment for holding the compartment to which it is hinged against side tilting movement, and means on the other compartment to engage said rear wall for holding said other compartment against tilting movement inwardly or outwardly in any position of its adjustment relative to the compartment to which the rear member is hinged.

3. In a stove, the combination of two combustion compartments, each having sheet metal outer and end portions and a perforated inner portion, and each being designed to stand in upright position, a sheet metal rear wall for the stove hingedly connected to one of the combustion compartments and capable in one position of lying flat against it and in another position of extending at substantially right angles to it in engagement with the rear edge of the other compartment for holding the compartment to which it is hinged against said tilting movement, and a rod hinged to the inner upper portion of one of the compartments capable of swinging from a substantially horizontal position downwardly to a substantially vertical position, the other compartment being formed with openings in its inner and outer walls through which said rod is slidingly extended to perform the double function of holding an article to be cooked between the compartments and also tending to prevent the compartment through which it is extended from tilting outwardly or inwardly relative to the stove.

4. In a stove, the combination of two combustion compartments each having sheet metal outer and end portions and a perforated inner portion, and each being designed to stand in upright position, a sheet metal rear wall for the stove, hingedly connected to one of the combustion compartments and capable in one position of lying flat against it and in another position of extending at substantially right angles to it in engagement with the rear edge of the other compartment for holding the compartment to which it is hinged against side tilting movement, and means for holding the other compartment against tilting movement inwardly or outwardly relative to the stove in any position of its adjustment relative to the compartment to which the rear member is hinged, said means comprising a hook shaped member fixed to said other compartment and extended over and downwardly in the rear of the rear wall.

5. A stove of the character described, comprising in combination two combustion compartments, each comprising an outer and end wall made of sheet metal, and inner wall and bottom made of screen, the bottom being spaced above the bottom of the outer wall, said members being so formed that they will rest in an upright position on the ground surface and receive a quantity of fuel such as charcoal between the inner and outer wall of each member, and a rod supported by both compartments and extending across the space between them and designed to receive and support an article to be cooked.

6. A stove of the character described, comprising in combination two combustion compartments, each comprising an outer and end walls made of sheet metal, and inner wall and bottom made of screen, the bottom being spaced above the bottom of the outer wall, said members being so formed that they will rest in an upright position on the ground surface and receive a quantity of fuel such as charcoal between the inner and outer wall of each member, means for securing one of said compartments to the ground against tilting movement, and means connected with said compartment to support the other compartment against tilting movement when in any position of its adjustment toward and from the compartment secured to the ground.

7. An improved camper's charcoal stove, comprising two combined magazines and grates, each having a substantially air tight outer wall and substantially air tight end walls, and grate surfaces forming an inner wall with a bottom member extending from the lower edge of the grate outwardly to the outer wall to serve as a fuel container, and spaced above the bottom of said outer wall.

8. An improved camper's charcoal stove, comprising two combined magazines and grates, each having a substantially air tight outer wall and substantially air tight end walls, and grate surfaces forming an inner wall with a bottom member spaced above the bottom of the outer wall and extending from the lower edge of the grate outwardly to the outer wall to serve as a fuel container, said magazines being adapted to be supported in upright positions with the grate surfaces adjacent to each other, and one being capable of movement relative to the other to separate the grate surfaces more or less apart from each other, a back member to cover the space between the rear edges of the magazines and a removable top member capable in one position of being placed against the front of the stove and in another position of being placed on top of the stove to cover the open ends of both fuel magazines and the space between the magazines, to thereby prevent combustion of the fuel contained within the magazines above the grate surfaces, and to retain the heat in the space between the grate surfaces for the purpose of giving the combined action of directing heat from the burning fuel through the grate surfaces and retaining the heat in an oven-like manner.

9. An improved camper's charcoal stove, comprising two combined magazines and grates, each having a substantially air tight outer wall and substantially air tight end walls, and each having an inner wall, the upper portion of which is formed solid and the lower portion of the inner wall comprising a grate surface which extends downwardly to a point spaced above the bottom of the outer wall, a bottom member extending from the lower edge of the grate outwardly to the outer wall to serve as a fuel container, said magazines being adapted to be supported in upright positions with the grate surfaces adjacent to each other, and one being capable of movement relative to the other to separate the grate surfaces more or less apart from each other, a back member to cover the space between the rear edges of the magazines, and a removable top member capable in one position of being placed against the front of the stove and in another position of being placed on top of the stove to cover the open ends of both fuel magazines and the space between the magazines, to thereby prevent combustion of the fuel contained within the magazines above the grate surfaces, and to retain the heat in the space between the grate surfaces for the purpose of giving the combined action of directing heat from the burning fuel and through the grate surfaces and retaining the heat in an oven-like manner.

Des Moines, Iowa, December 17, 1927.

BENJAMIN F. ELBERT